United States Patent
Ehmig et al.

(10) Patent No.: US 9,458,948 B2
(45) Date of Patent: Oct. 4, 2016

(54) RISING HAND VALVE WITH STROKE LIMITER

(71) Applicant: SED Flow Control GmbH, Bad Rappenau (DE)

(72) Inventors: Uwe Ehmig, Bad Friedrichshall (DE); Valentin Mall, Gundelsheim-Obergriesheim (DE); Uwe Rutsch, Forchtenberg-Sindringen (DE)

(73) Assignee: SED Flow Control GmbH, Bad Rappenau (DE)

( * ) Notice: Subject to any disclaimer, the term of this patent is extended or adjusted under 35 U.S.C. 154(b) by 208 days.

(21) Appl. No.: 14/054,259

(22) Filed: Oct. 15, 2013

(65) Prior Publication Data

US 2014/0131607 A1    May 15, 2014

(30) Foreign Application Priority Data

Oct. 12, 2012  (DE) .......................... 10 2012 109 756

(51) Int. Cl.

| F16K 35/06 | (2006.01) |
|---|---|
| F16K 7/16 | (2006.01) |
| F16K 31/50 | (2006.01) |
| F16K 7/12 | (2006.01) |

(52) U.S. Cl.
CPC ............. *F16K 31/508* (2013.01); *F16K 7/126* (2013.01); *F16K 35/06* (2013.01); *F16K 7/16* (2013.01); *F16K 31/504* (2013.01)

(58) Field of Classification Search
CPC ...... F16K 31/504; F16K 7/16; F16K 31/508; F16K 35/06; F16K 7/126

USPC ......... 251/89, 264, 266, 273, 284, 285, 289; 137/553, 385

See application file for complete search history.

(56) References Cited

U.S. PATENT DOCUMENTS

| 2,599,286 | A | * | 6/1952 | Rockwell | ............... G05B 11/50 |
|---|---|---|---|---|---|
| | | | | | 116/277 |
| 3,347,270 | A | | 10/1967 | Cranage | |
| 3,565,089 | A | * | 2/1971 | Thompson | ................. 137/68.16 |

(Continued)

FOREIGN PATENT DOCUMENTS

| DE | 18 53 050 | 6/1962 |
|---|---|---|
| DE | 16 00 813 | 5/1970 |

(Continued)

OTHER PUBLICATIONS

Machine translation of FR 1103790 A.*

(Continued)

*Primary Examiner* — Mary McManmon
*Assistant Examiner* — Patrick Williams
(74) *Attorney, Agent, or Firm* — Day Pitney LLP (57) ABSTRACT

The invention relates to a hand valve with a valve main body and a spindle movably arranged therein in at least in one actuating direction which can be adjusted for actuating the hand valve by means of a hand wheel arranged on the spindle in its position relative to the valve main body together with the hand wheel. The hand valve has a stroke limitation for the spindle with a stopper element which is adjustable in its position with respect to the valve main body. The invention is characterized in that the stroke limitation has a holding device for the stopper element which is held rotatable with the hand wheel, but fixed in its position to the valve main body in the actuating direction of the spindle at the valve main body.

19 Claims, 9 Drawing Sheets

(56) References Cited

U.S. PATENT DOCUMENTS

| | | | | |
|---|---|---|---|---|
| 3,712,587 | A * | 1/1973 | Specht | 251/285 |
| 3,831,621 | A * | 8/1974 | Anthony et al. | 137/270 |
| 5,377,956 | A * | 1/1995 | Muller | 251/331 |
| 5,823,509 | A * | 10/1998 | Daniels | 251/335.2 |
| 6,241,213 | B1 * | 6/2001 | Butler | 251/264 |
| 6,691,737 | B2 * | 2/2004 | Muller et al. | 137/556 |
| 7,677,530 | B2 * | 3/2010 | Hasunuma | F16K 1/06 251/122 |
| 2009/0039304 | A1 * | 2/2009 | Ishihara et al. | 251/264 |

FOREIGN PATENT DOCUMENTS

| | | | |
|---|---|---|---|
| DE | 32 12 792 A1 | 10/1983 | |
| DE | 20 2010 008 574 | 1/2011 | |
| EP | 0 387 634 A1 | 9/1990 | |
| EP | 1 257 755 B1 | 11/2002 | |
| FR | 1103790 A * | 11/1955 | F16K 1/523 |
| FR | 1 482 169 A | 5/1967 | |
| FR | 2 228 996 A1 | 12/1974 | |

OTHER PUBLICATIONS

Search Report issued in corresponding German patent application No. DE 10 2012 109756, Aug. 13, 2013.

Search Report issued in corresponding European published patent application No. EP 2 719 932 A1, Jan. 28, 2014.

* cited by examiner

RISING HAND VALVE WITH STROKE LIMITER

CROSS-REFERENCE TO RELATED PATENT APPLICATION

This application claims the benefit of German Patent Application No. 10 2012 109 756.9, filed on Oct. 12, 2012 in the German Patent Office, the disclosure of which is incorporated herein in its entirety by reference.

BACKGROUND

1. Field of Art

The present invention relates to a hand valve with a valve main body and a spindle movably arranged therein in at least one actuating direction which can be adjusted for actuating the hand valve by means of a hand wheel arranged on the spindle in its position relative to the valve main body together with the hand wheel, wherein the hand valve has a stroke limitation for the spindle with a stopper element which is adjustable in its position with respect to the valve main body.

2. Background

Such hand valves are also referred to as rising hand valves. In rising hand valves the valve is opened and closed, respectively, by rotating the hand wheel, with the hand wheel together with the spindle in the actuating direction moving either away from the valve main body or towards the valve main body. Accordingly, the actuating direction extends in the longitudinal direction of the spindle. In contrast, in a non-rising hand wheel only the spindle moves, with the hand wheel moving not towards or away from the valve main body.

It is suitable for many fields of application to provide such hand valves with a stroke limitation. Here, the maximum opening of the hand valve can be adjusted by limiting the movement of the spindle along the actuating direction with an opening movement. Generally, for that a stopper element is used against which the spindle or another part moving with the spindle hits. In order to limit the stroke the position of the stopper element relative to the valve main body can be adjusted. When the stroke should be limited more the distance between the stopper element and the valve main body is decreased. Accordingly, with a greater maximum stroke the distance between the valve main body and the stopper element is increased.

In non-rising hand valves the stopper element can be directly arranged on the hand wheel, since the hand wheel does not move with the spindle upon actuation and thus, the distance between the stopper element and the valve main body remains constant. Such a stroke limitation for a non-rising hand wheel is shown for example in EP 1 257 755 B1.

However, in rising hand valves there arises the problem that the hand wheel moves together with the spindle. Thus, with an integrated stroke limitation for adjusting the maximum stroke the stopper element must be either directly arranged on the valve main body or the valve main body must have a fixed stop for a stopper element arranged on the spindle. In order to be able to rapidly and simply change the stopper element in its position thus a relatively big hand valve is required, since the stopper element for position adjustment must be well accessible, in particular when a tool for the adjustment is to be used. For example, the latter is the case when the stroke limitation is done via a hexagon nut or screw, respectively, or the like.

However, when a compact construction is desired the accessibility to the stopper element is limited, whereby the stroke limitation can only be adjusted at great expense with special tool or even by at least partial disassembly of the hand valve.

Thus, it is the object of the present invention to provide a compact rising hand valve with an integrated stroke limitation wherein the maximum stroke of the spindle can be rapidly and simply adjusted without great expense.

The solution of the problem is achieved with a hand valve according to claim 1. Suitable developments are described in the dependent claims.

In comparison to the known hand valves the present invention is characterized in that the stroke limitation has a holding device for the stopper element which is held rotatable with the hand wheel, but fixed in its position to the valve main body in the actuating direction of the spindle at the valve main body. Here, the holding device is designed such that the position of the stopper element at the holding device can be changed, wherein in fact the holding device on actuation of the hand valve rotates together with the hand wheel and the spindle, but does not move along the actuating direction. This has the advantage that a stroke limitation integrated in the hand valve is established. Moreover, the stopper element can be well accessibly arranged to adjust its position so that in the best case no tool is necessary for adjusting the stroke limitation. Further, by the integrated design of the stroke limitation the seal of the valve can already be optimized by the manufacturer so that a much better tightness is obtained in comparison to add-on stroke limitations and at the same time a compact construction is established. As a valve main body according to the invention a one-part or multiple-part body can be understood. In particular, multiple-part embodiments, for example with a valve body and a hand valve upper part, not least are suitable in view of maintenance and mounting.

As a further development, the stopper element is adjustable in its position with respect to the valve main body by an actuating element arranged on the hand wheel. Thus, for adjusting the position of the stopper element no separate tool is necessary, since the tool is virtually integrated in the hand valve. This markedly facilitates the handling of the valve and the adjustability of the stroke again.

It is preferred, if the stopper element is a threaded nut having a male thread, and the holding device is a threaded sleeve having a female thread. By rotating the threaded nut it moves along the thread fillets of the threaded sleeve, which makes it particularly quickly and accurately changeable in its position with respect to the valve main body.

It is further of advantage if the hand valve has a closing limitation, wherein between the hand wheel and the spindle a coupling element is arranged to be able to optionally release or establish the rotary connection of the hand wheel and the spindle. For that, the hand wheel for closing limitation has a threaded bushing with a female thread, with the spindle with its male thread being threaded into the threaded bushing. Preferably, the threaded bushing is integrally formed with the hand wheel. With a released rotary connection the spindle is movable relative to the hand wheel in the actuating direction by rotating the hand wheel to adjust the closed position of the spindle. Thus, with the coupling element it can be made possible that the spindle can be rotated independently from the hand wheel. If the hand wheel in its maximum closing position is further rotated the spindle moves along the actuating direction by which the maximum closing position is adjusted. Alternatively, the hand wheel can also be moved independently from the spindle along the actuating direction by which the closing position can be changed in the other direction. If thus the desired closing position of the spindle is achieved the connection between the hand wheel and the spindle is again established by the coupling element which again makes the hand wheel rotatable together with the spindle for actuating the hand valve. In this way, an integrated closing limitation is achieved that is independent from the stroke limitation by which the closing position can be adjusted without great expense or separate tools. Further, in this way after actuating the closing limitation or the stroke limitation the respective other limitation must not be readjusted.

Preferably, the actuating element for the stroke limitation is the coupling element of the closing limitation. So, with one single member two different functions can be implemented in a particularly compact manner. So, with a released rotary connection the closing limitation can be actuated by rotating the hand wheel, and by rotating the actuating or coupling element, respectively, the stroke can be adjusted. This results in a particular compact construction wherein both the closing and the stroke limitation can be actuated easily and quickly.

Preferably, the threaded bushing of the closing limitation with an established rotary connection in the closing position of the spindle hits the valve main body. As soon as the threaded bushing hits, the hand wheel can no longer be actuated, so that the hand valve is fully closed. If now the rotary connection between the coupling or actuating element, respectively, and the hand wheel is released, the closing limitation can be adjusted as described above.

It is of advantage, if the hand wheel has at least one land, preferably three lands, wherein the at least one land positively engages a groove of the holding device of the stroke limitation. Thus, the holding device or threaded sleeve, respectively, of the stroke limitation together with the hand wheel can be rotated via a positive connection without constraining lifting and lowering, respectively, of the hand wheel.

As a further development, the at least one land is connected to the threaded bushing. Thus, the threaded bushing together with the at least one land can form a compact unit on the hand wheel.

Preferably, the actuating element has at least one projection, preferably four projections, wherein the at least one projection positively engages a recess of the stopper element. Preferably, these are formed as longitudinal lands extending parallel to the actuating direction, so that even with different positions of the stopper element they are engaging it, and even in a slightly lifted position the actuating element can be actuated—that is rotated by hand—to adjust the height position of the stopper element. In this way, the actuating element is non-rotatable connected to the stopper element, whereby the above-described function of adjusting the stroke can easily be realized.

Preferably, the hand valve has a visual display arranged at the valve main body, wherein the visual display in der closing position of the spindle is at least partially covered by the hand wheel. By actuating the hand valve the visual display either becomes visible to a greater extent (opening movement in the actuating direction) or is further covered (closing movement in the actuating direction). In this way, the closing position of the valve with the help of the visual display can be readily read at a glance. Here it is of advantage if the visual display has scale facilitating the evaluation of the position.

It is of advantage, if the visual display has an at least partially surrounding projection fixing the holding device in its position with respect to the valve main body. In this way, it can be ensured that the holding device or the threaded sleeve, respectively, is rotatable with the hand wheel, but at the same time cannot move in the actuating direction, in particular when the visual display is fixed at the valve main body.

As a further development, the hand valve has a slidable locking element that is guided at the hand wheel, wherein the valve main body or the visual display has a plurality of locking grooves. The locking element is engageable with one of the locking grooves, so that the hand wheel is secured against twisting in respect to the valve main body or the visual display. In this way, a desired opening and closing position of the hand valve can be fixed, so that an unwanted or undesired actuation is avoided.

For that, it may be suitable if the locking element can be secured in the engagement position, in particular by a lock or the like. In this way, actuation of the hand valve can be safely avoided to prevent unauthorized access.

Preferably, the hand wheel has a first marker and each locking groove has a second marker, wherein the locking element upon alignment of the first and second markers is engageable with the locking grooves. So it is ensured that the locking element is to be safely inserted into a locking groove and the desired position of the hand valve can be secured.

It is of advantage, if at least one seal is arranged between the valve main body and the visual display and/or between the visual display and/or between the actuating element and the hand wheel. Thus, a maximum tightness of the entire hand valve can be achieved. This plays an important role for example in cleaning the hand valve, since with an insufficient tightness the lubrication of the spindle can be washed out over time which possibly leads to damages or loss of function. Such a sealing and thus longevity which are extremely good for a rising hand valve can especially be achieved with a combined stroke and closing limitation. Also, this way penetration of moisture or dirt is reliably prevented.

Preferably, the rotary connection between the hand wheel and the spindle is a tooth connection. Accordingly, in particular the coupling element or the actuating element, respectively, positively engages the hand wheel via a tooth connection, so that with an engaged tooth connection a safe power transmission from the hand wheel to the spindle can be ensured. Here, the tooth connection can be designed in the form of a toothed rim attached to the coupling element that preferably has a very fine tooth structure to enable a finer adjustment.

As a further development, the actuating element is screwed on the spindle via a locking screw. For example, the spindle can engage the actuating element via a two edge or spring/groove connection, wherein the actuating element is secured at the spindle by a screw. Thus, the actuating element cannot accidentally be actuated, since at first the screw is to be loosened.

Here, it is of advantage if at least one seal is arranged between the locking screw and the actuating element. In this way, the tightness of the hand valve is further increased, so that no moisture, dirt, or the like penetrates.

BRIEF DESCRIPTION OF THE DRAWINGS

In the following, the invention is explained in more detail with the help of examples illustrated in the drawings. Here.

DETAILED DESCRIPTION

In FIGS. 1 to 7, the hand valve 1 is illustrated in the form of a diaphragm valve with a multiple-part valve main body 2 and a spindle 3 movably arranged therein. In this example, the valve main body 2 consists of a valve body 2a as well as a hand valve upper part 2b, which can be screwed together, for example. The spindle 3 can be adjusted for actuating the hand valve 1 by means of a hand wheel 4 arranged at the spindle 3 in its position relative to the valve main body 2 together with the hand wheel 4. If, as shown, a right-handed thread is used for the adjustment, the hand valve 1 is closed by clockwise rotating the hand wheel 4. By anticlockwise rotating the hand wheel 4 the hand valve 1 is opened. To close the hand valve 1 a thrust member 25 is arranged at the spindle 3 that acts on a diaphragm 26 in a conventional manner. Of course, also types with a left-handed thread are conceivable.

Further, the hand wheel 4 has an integrally threaded bushing 10 that is connected to the hand wheel 4 via three lands 11. As seen in particular in FIGS. 3, 4, 6, and 7, the spindle 3 is screwed into the threaded bushing 10.

The hand valve 1 has a stroke limitation 5 that comprises a stopper element in the form of a threaded nut 6 having a male thread, and a holding device in the form of a threaded sleeve 7 having a female thread. As illustrated in FIGS. 3, 4, 6, and 7, the threaded nut 6 is screwed into the threaded sleeve 7. The threaded sleeve 7 is arranged at the hand valve upper part 2b of the valve main body 2 and has three grooves 12 which positively engage the three lands 11 of the hand wheel. Thus, also the threaded sleeve 7 is rotated upon rotation of the hand wheel 4. The threaded sleeve 7—as is described in the following—is not movable in the actuating direction of the spindle 3. In other words, certainly the threaded sleeve 7 can be rotated with respect to the valve main body 2, but cannot be moved away from it or towards the same. Accordingly, a translational motion with respect to the valve main body 2 is not possible.

Figure 1:
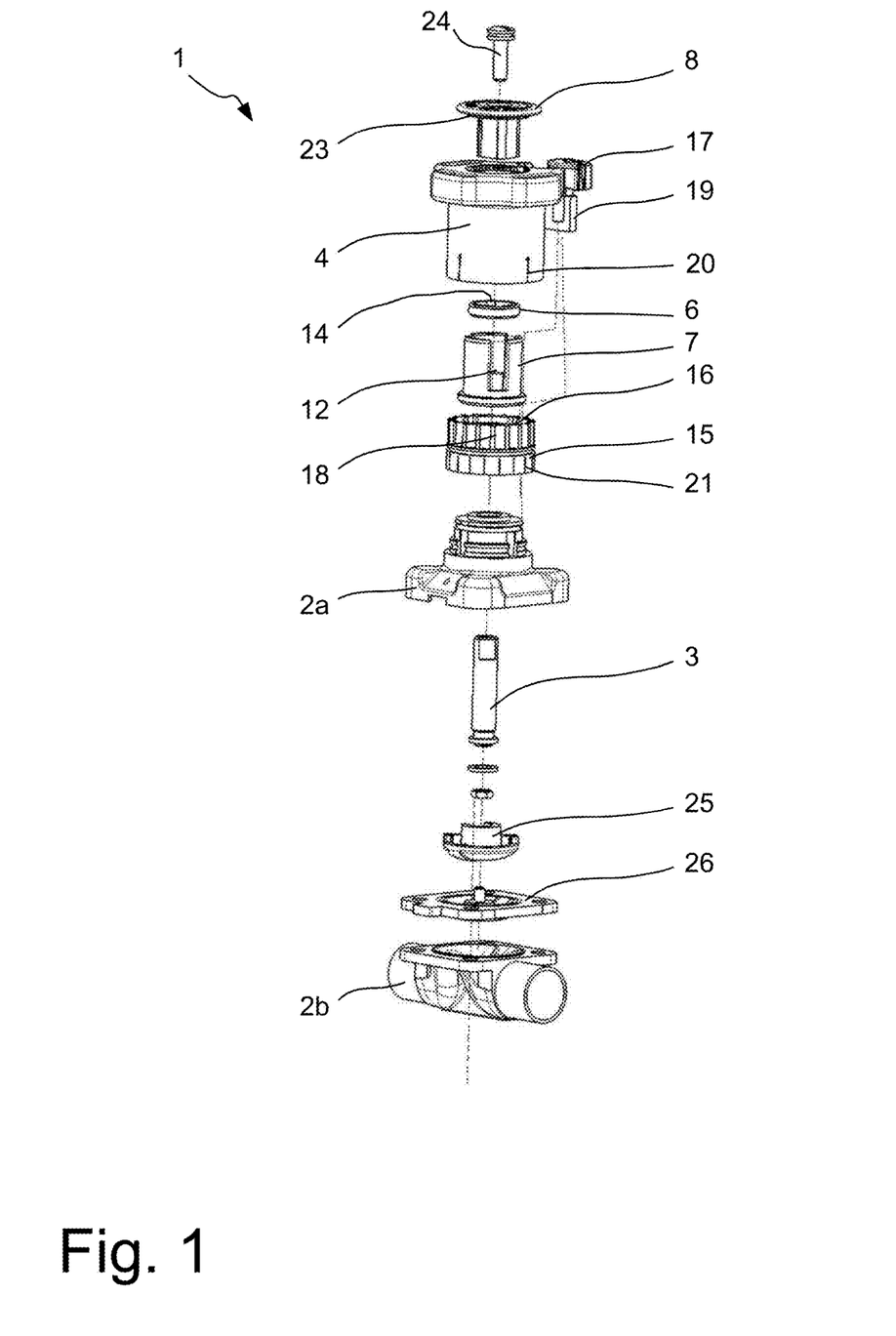
FIG. 1 shows an exploded view of the hand valve according to the invention.
Figure 2:
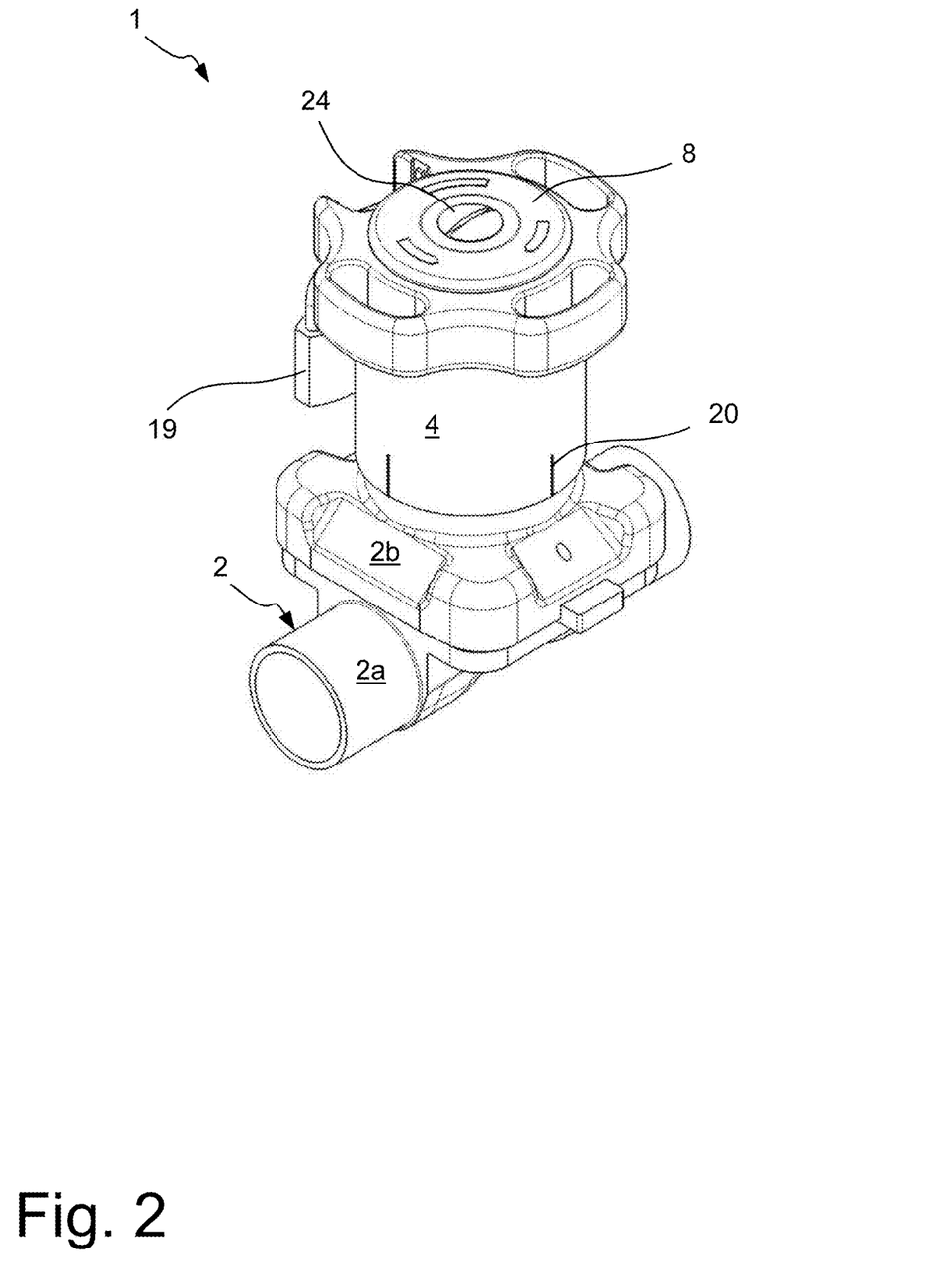
FIG. 2 shows a perspective view of a hand valve with a stroke limitation in a first position according to the invention.
Figure 3:
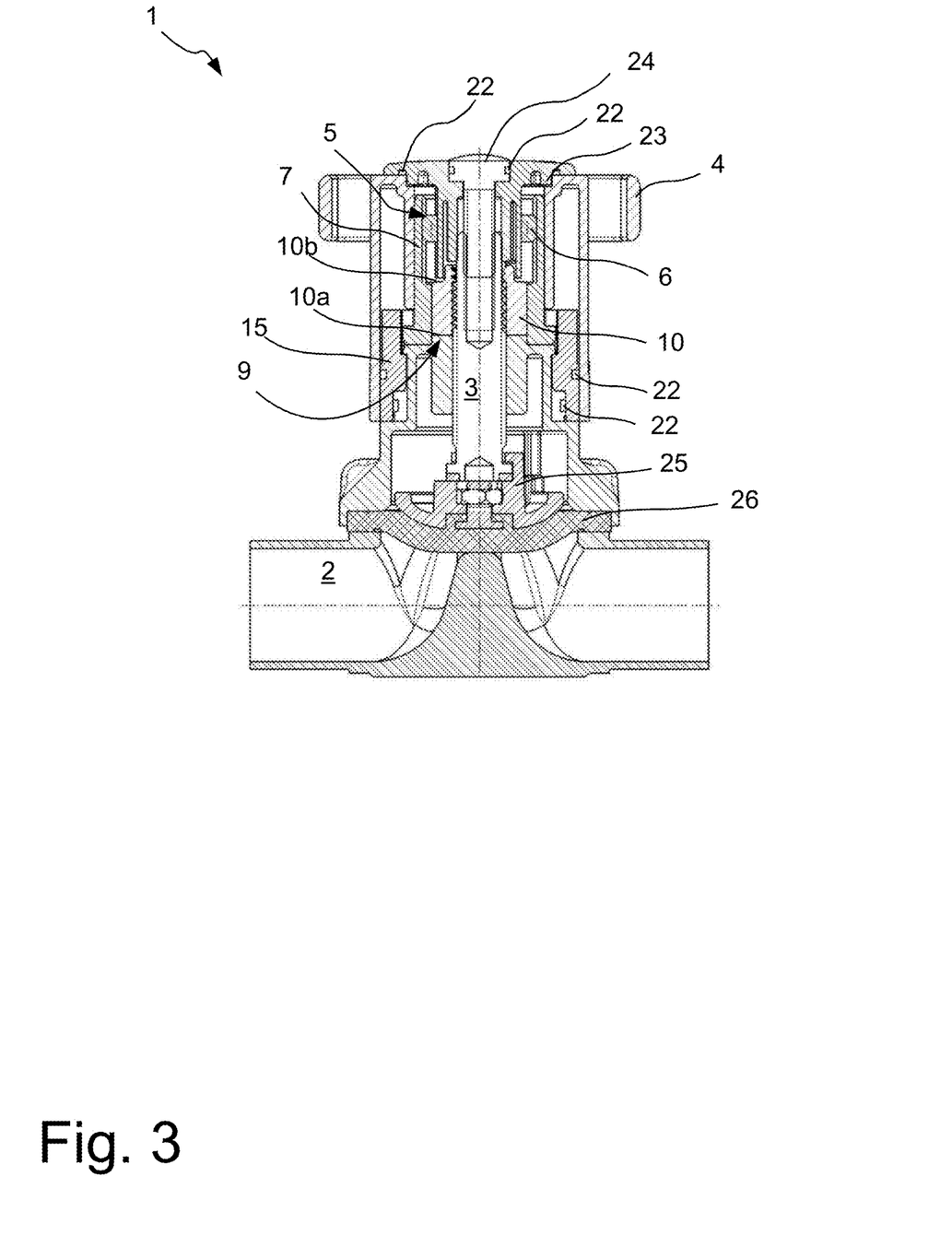
FIG. 3 shows a section through the hand valve shown in FIG. 2 along the connecting direction of the hand valve.
Figure 4:
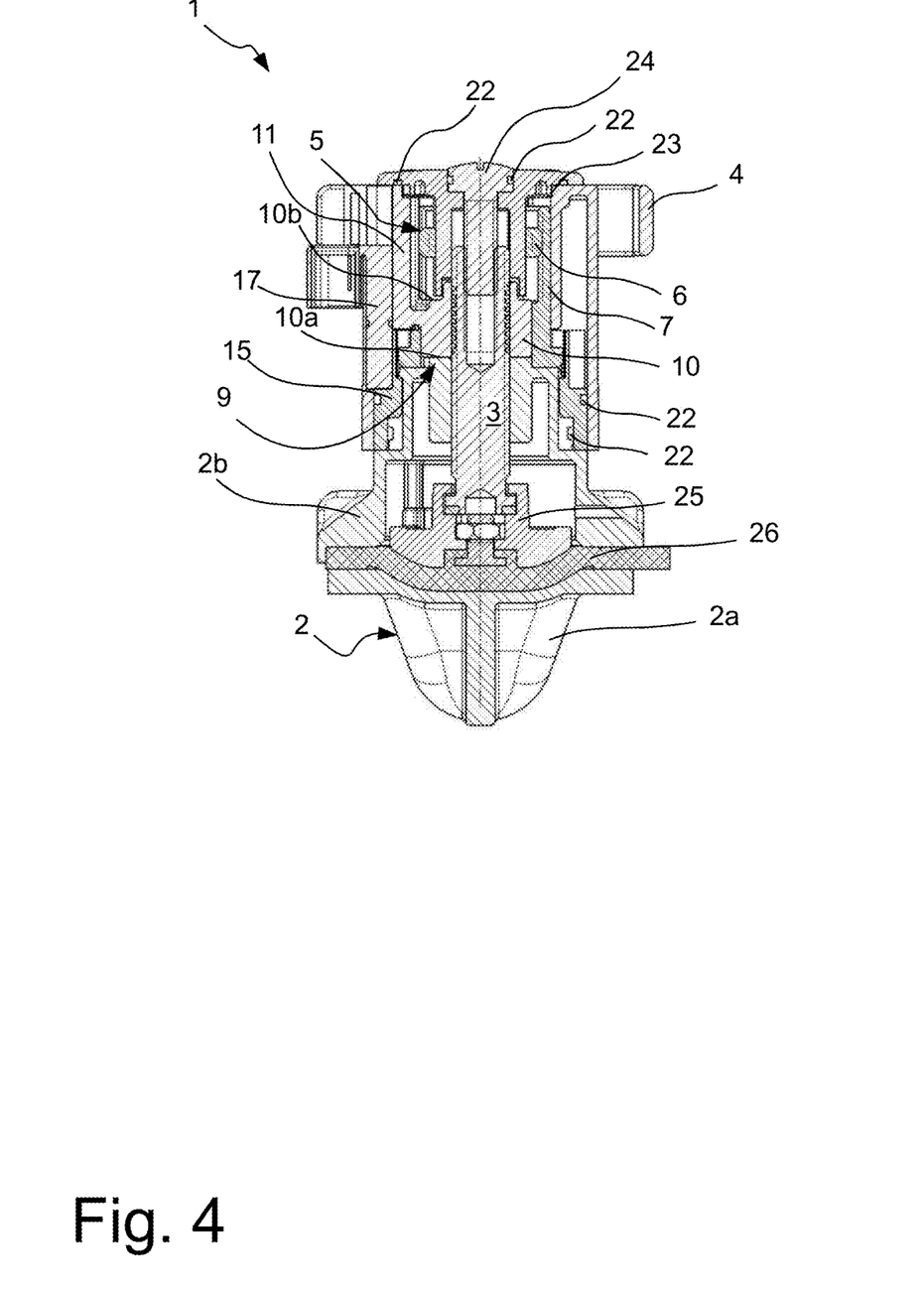
FIG. 4 shows a section through the hand valve shown in FIG. 2 orthogonally to the connecting direction of the hand valve.
Figure 5:
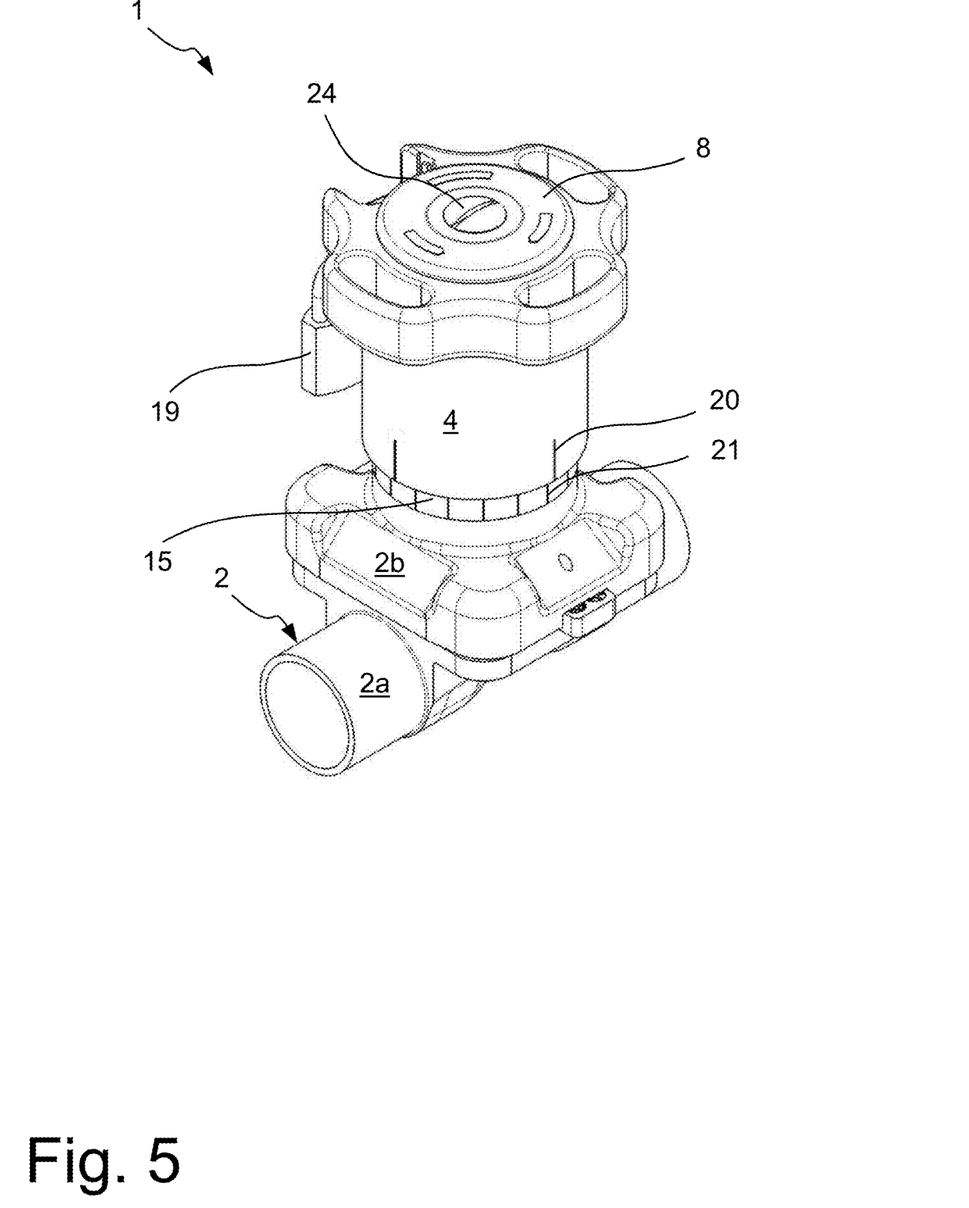
FIG. 5 shows a perspective view of a hand valve with stroke limitation in a second position according to the invention.
Figure 6:
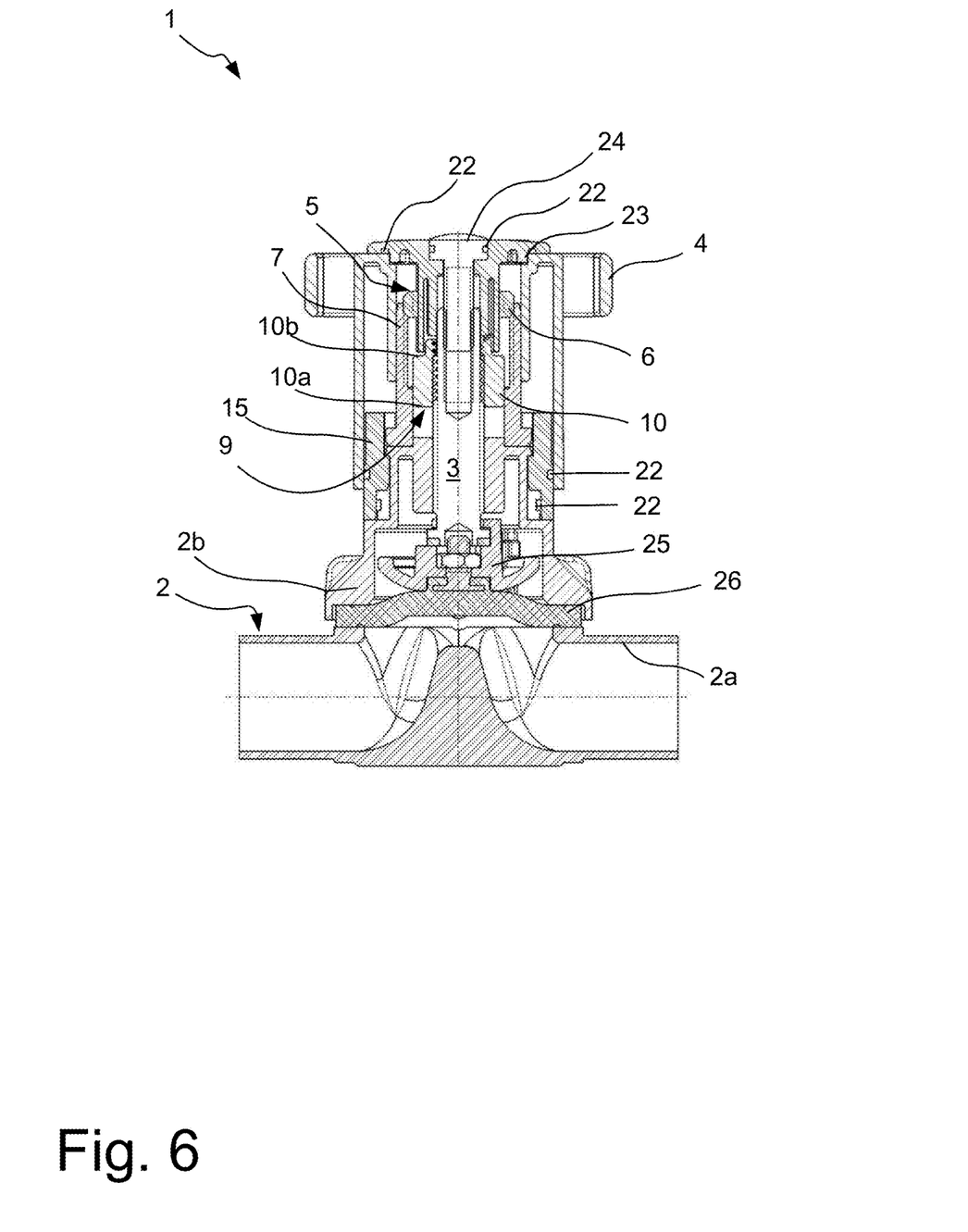
FIG. 6 shows a section through a hand valve shown in FIG. 5 along the connecting direction of the hand valve.
Figure 7:
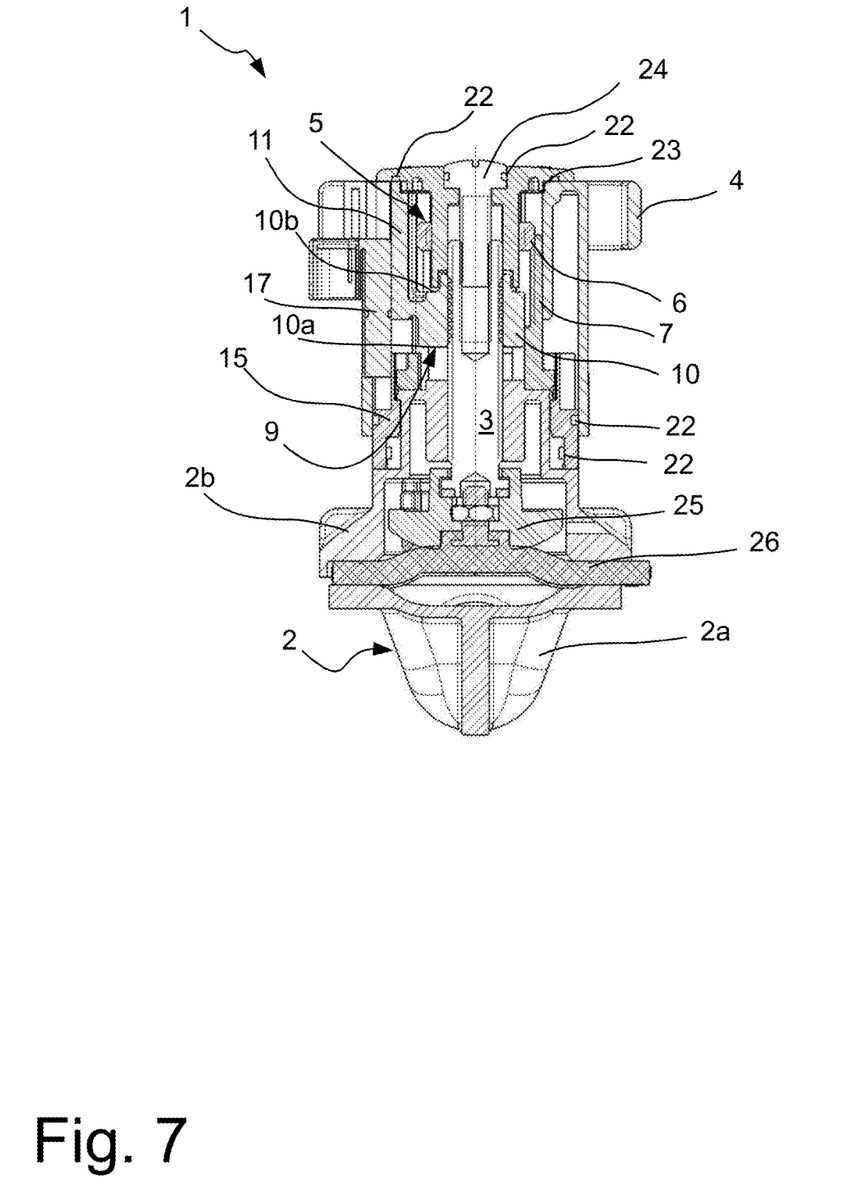
FIG. 7 shows a section through the hand valve shown in FIG. 5 orthogonally to the connecting direction of the hand valve.

To change the stroke, the position of the threaded nut 6 in the threaded sleeve 7 is changed by screwing in or out, respectively. In FIGS. 6 and 7, the threaded nut 6 is screwed onto the upper end of the threaded sleeve 7, so that a maximum stroke can be achieved. In contrast, as illustrated in FIGS. 3 and 4, the threaded nut 6 is further screwed into the threaded sleeve 7, so that a smaller maximum stroke is achieved. If the hand wheel 4 is actuated to open the hand valve 1 the hand wheel 4 along with the spindle 3 moves away from the valve main body 2. Here, in fact also the threaded sleeve 7 is rotated, but it is not moved away from the valve main body 2. Therefore, the adjusted distance between threaded nut 6 and valve main body 2 remains constant. As long as the threaded bushing 10 with the upper stop surface 10a hits the threaded nut 6, the hand wheel 4 can no longer be actuated, so that the stroke of the spindle 3 thus is limited accordingly.

For screwing in and out the threaded nut 6 the hand valve 1 has an actuating or coupling element 8, respectively, which on the one hand serves to be able to establish and release a rotary connection between hand wheel 4 and spindle 3. On the other hand, via the actuating element 8, with the rotary connection being released, the threaded nut 6 can be rotated relative to the threaded sleeve 7 and screwed into or out of it, respectively. For that, the actuating element 8 has four projections 13 that positively engage the corresponding recesses of the threaded nut 6. Thus, by rotating the actuating element 8 relative to the hand wheel 4 the threaded nut 6 is moved relative to the threaded sleeve 7, since the threaded sleeve 7 is non-rotatable connected to the hand wheel 4. In this way, the desired stroke can be adjusted.

Further, the hand valve 1 comprises a closing limitation 9 with which the closing position of the spindle 3 can be adjusted. For that, also the rotary connection between actuating element 8 and hand wheel 4 has to be released. Then, the spindle 3 can be rotated relative to the hand wheel 4. For that, the hand wheel 4 at first is completely screwed in until the lower stop surface 10b of the threaded bushing 10 hits the hand valve upper part 2b of the valve main body 2. If the hand wheel 4 is now further rotated, only the spindle 3 is moved in its position relative to the valve main body 2, but not the hand wheel 4 any more. By holding the actuating element 8 and anticlockwise rotating the hand wheel 4 only the hand wheel 4 is changed in its position to the valve main body 2, by which the closing position can be changed in the other direction. Here it is important that the positive connection between spindle 3 and actuating element 8, as illustrated in FIGS. 3, 4, 6, and 7, provides for sufficient working range, so that, whichever closing position is adjusted, the spindle 3 is inserted deeper into or taken out of the actuating element 8 without the positive engagement between spindle 3 and actuating element 8 being released. In this example, the connection between actuating element 8 and spindle 3 is realized by a two-edge connection, but also other connections for power transmission are possible.

In order to be able to establish and release the rotary connection between actuating element 8 and hand wheel 4 a tooth connection 23 is provided which with lifted actuating element 8 is no longer connected to the tooth connection 23 of the hand wheel 4. Thus, in this case the rotary force can no longer be transmitted from the hand wheel 4 to the spindle 3. In this example, the actuating element 8 can additionally be secured by a locking screw 24 that is screwed into the spindle 3.

Further, the hand valve 1 has a visual display 15 that is covered by the hand wheel 4 with a completely closed hand valve 1. The visual display 15 is stationary arranged at the valve main body 2 and the hand valve upper part 2b, respectively, and becomes visible little by little upon anticlockwise rotation of the hand wheel 4. With the help of the visual display 15 it can then be determined at a glance how far the hand valve 1 is open or closed.

Figure 9:
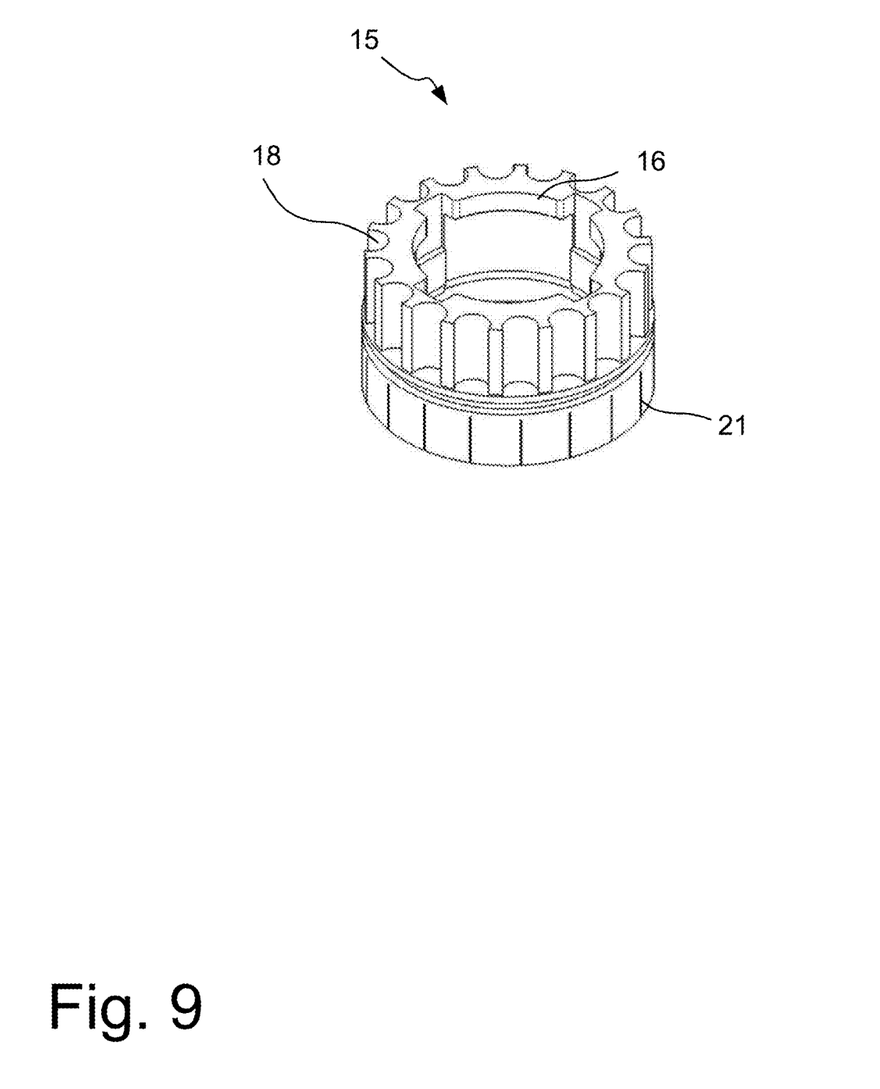
FIG. 9 shows a perspective view of the visual display.

Moreover, the visual display has an at least partially surrounding projection 16, as in particular can be seen in FIG. 9. Said projection 16 fixes the threaded sleeve 7 such that, in fact it is rotatable with respect to the valve main body 2, but cannot be moved back and forth by it. This is necessary for the above-described stroke limitation 5, however, the threaded sleeve 7 could also be defined by a clamping ring or the like, so that the visual display 15 must not necessarily be provided.

Figure 8:
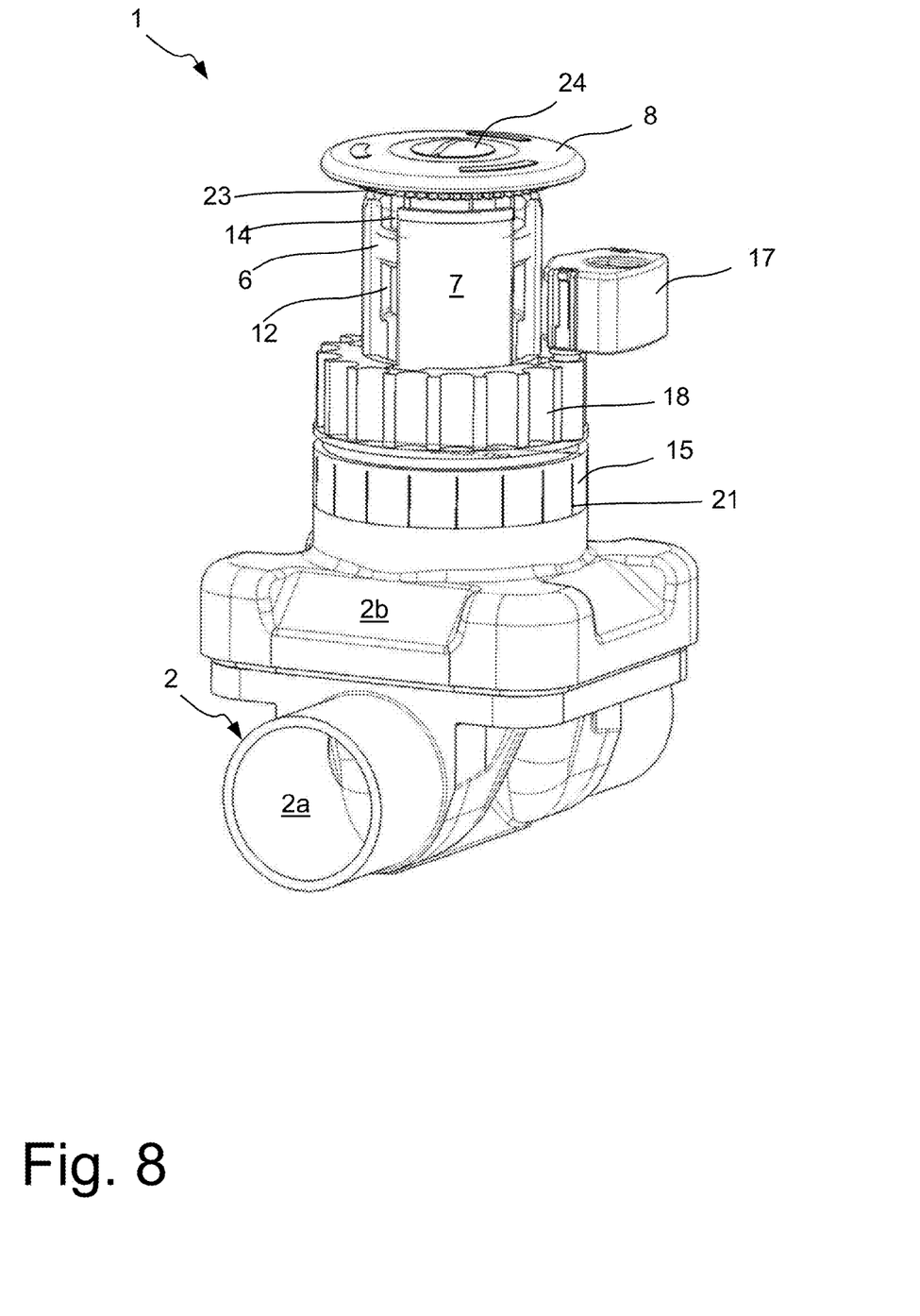
FIG. 8 shows a perspective view of the hand valve according to the invention without a hand wheel.

Moreover, it can be seen in FIGS. 8 and 9 that the visual display 15 has a plurality of surrounding locking grooves 18. These locking grooves 18 interact with a locking element 17 that is linearly guided on the hand wheel 4 and which can be moved in parallel to the spindle 3. If the locking element 17 is moved towards the valve main body 2 the lower part of the locking element 17 engages one of the locking grooves 18 of the visual display 15 such that a rotation of the hand wheel 4 is no longer possible. In the engagement position, the locking element 17 can be fixed with a lock 19, for example (cf., FIG. 8).

In order to be able to insert the locking element 17 in a fitting manner into one of the locking grooves 18 the hand wheel 4 has a first marker 20 and the visual display 15 at the position of the corresponding locking groove 18 has a second marker 21. As soon as the two markers 20, 21 are aligned, the locking element 17 can be inserted into the locking groove 18.

In order to ensure a sufficient tightness the hand valve 1 is provided with a number of seals 22 between the single elements. In this example, the seals 22 are designed as 0 rings resting in the corresponding grooves. Seals 22 are provided between the visual display 15 and the valve main body 2 or the hand valve upper part 2b, respectively, between the hand wheel 4 and the visual display 15, between the actuating element 8 and the hand wheel 4 as well as between the locking screw 24 and the actuating element 8. Of course, also further seals are provided, as for example between the valve body 2a and the hand valve upper part 2b.

LIST OF REFERENCE NUMBERS

1 Hand Valve
2 Valve Main Body
2a Valve Body
2b Hand Valve Upper Part
3 Spindle
4 Hand Wheel
5 Stroke Limitation
6 Threaded Nut (Stopper Element)
7 Threaded Sleeve (Holding Device)
8 Actuating Element (Coupling Element)
9 Closing Limitation
10 Threaded Bushing
10a Upper Stop Surface
10b Lower Stop Surface
11 Land
12 Groove of the Threaded Sleeve
13 Projection of the Actuating Element
14 Recess of the Threaded Nut
15 Visual Display
16 Projection of the Visual Display
17 Locking Element
18 Locking Groove
19 Lock
20 First Marker
21 Second Marker
22 Seal
23 Tooth Connection
24 Locking Screw
25 Thrust Member
26 Diaphragm

The invention claimed is:

1. A hand valve comprising:
   a valve main body and a spindle movably arranged therein in at least one actuating direction which can be adjusted for actuating the hand valve by means of a hand wheel arranged on the spindle in its position relative to the valve main body together with the hand wheel, wherein the hand valve has a stroke limitation for the spindle integrated therein with a stopper element which is adjustable in its position with respect to the valve main body,
   wherein the stroke limitation has a holding device for the stopper element which is held rotatable with the hand wheel, wherein the position of the stopper element at the holding device can be changed so that the holding device, on actuation of the hand valve, is configured to rotate with the hand wheel and spindle, but fixed in its position in respect to the valve main body in the actuating direction of the spindle at the valve main body to attain maximum stroke of the spindle;
   wherein the hand valve has a closing limitation, wherein between the hand wheel and the spindle a coupling element is arranged to selectively be able to release or establish the rotary connection of the hand wheel and the spindle; and
   wherein the hand wheel has a threaded bushing with a female thread for the closing limitation, wherein the spindle with its male thread is screwed into the threaded bushing, and the spindle with the released rotary connection is movable relative to the hand wheel in the actuating direction to adjust the closing position of the spindle by rotating the hand wheel.

2. The hand valve according to claim 1, wherein the stopper element is adjustable in its position at the holding device with respect to the valve main body by an actuating element arranged at the hand wheel.

3. The hand valve according to claim 1, wherein the stopper element is a threaded nut with a male thread and the holding device is a threaded sleeve with a female thread.

4. The hand valve according to claim 1, wherein the coupling element of the closing limitation is also the actuating element of the stroke limitation.

5. The hand valve according to claim 1, wherein the threaded bushing with the established rotary connection in the closing position of the spindle hits the valve main body.

6. The hand valve according to claim 1, wherein the hand wheel has at least one land, wherein the at least one land positively engages a groove of the holding device.

7. The hand valve according to claim 6, wherein the at least one land is connected to a threaded bushing.

8. The hand valve according to claim 2, wherein the actuating element has at least one projection, wherein the at least one projection positively engages a recess of the stopper element.

9. The hand valve according to claim 1, wherein the hand valve has a visual display arranged at the valve main body, wherein the visual display in the closing position of the spindle is at least partially covered by the hand wheel.

10. The hand valve according to claim 9, wherein the visual display has an at least partially surrounding projection, wherein the projection fixes the holding device in its position with respect to the valve main body.

11. The hand valve according to claim 9, wherein
the hand valve has a slidable locking element that is guided at the hand wheel,
wherein the valve main body or the visual display have a plurality of locking grooves,
wherein the locking element can be engaged with one of the locking grooves, so that the hand wheel is secured against rotation with reference to the valve main body or the visual display.

12. The hand valve according to claim 11, wherein
the locking element in the engagement position can be secured in particular by a lock.

13. The hand valve according to claim 11, wherein
the hand wheel has a first marker,
and each locking groove has a second marker,
wherein the locking element upon alignment of the first and second markers can be engaged with the locking grooves.

14. The hand valve according to claim 9, wherein
between the valve main body and the visual display at least one seal is arranged.

15. The hand valve according to claim 9, wherein
between the visual display and the hand wheel at least one seal is arranged.

16. The hand valve according to claim 2, wherein
between the actuating element and the hand wheel at least one seal is arranged.

17. The hand valve according to claim 1, wherein
the rotary connection between hand wheel and spindle is a tooth connection.

18. The hand valve according to claim 2, wherein
the actuating element is screwed together with the spindle via a locking screw.

19. The hand valve according to claim 18, wherein
between the locking screw and the actuating element at least one seal is arranged.

* * * * *